(12) United States Patent  (10) Patent No.: US 7,168,913 B2
Lardellier  (45) Date of Patent: Jan. 30, 2007

(54) TWIN-SPOOL TURBOJET WITH MEANS FOR DRIVING ANCILLARY MACHINES

(75) Inventor: Alain Lardellier, Melun (FR)

(73) Assignee: SNECMA Moteurs, Paris (FR)

( * ) Notice: Subject to any disclaimer, the term of this patent is extended or adjusted under 35 U.S.C. 154(b) by 102 days.

(21) Appl. No.: 11/006,687

(22) Filed: Dec. 8, 2004

(65) Prior Publication Data

US 2006/0034693 A1 Feb. 16, 2006

(30) Foreign Application Priority Data

Dec. 9, 2003 (FR) .................................. 03 14429

(51) Int. Cl.
*F01D 23/00* (2006.01)
(52) U.S. Cl. .................. 415/70; 415/68; 415/122.1
(58) Field of Classification Search .................. 415/70, 415/68, 122.1; 60/39.163
See application file for complete search history.

(56) References Cited

U.S. PATENT DOCUMENTS

| 2,984,975 A | | 5/1961 | Rodgers et al. |
| 4,251,987 A | * | 2/1981 | Adamson .................... 60/805 |
| 4,776,163 A | | 10/1988 | Brockmann |
| 4,936,748 A | | 6/1990 | Adamson et al. |
| 5,103,631 A | | 4/1992 | Edwards et al. |
| 6,672,049 B2 | * | 1/2004 | Franchet et al. ........... 60/226.1 |

FOREIGN PATENT DOCUMENTS

| FR | 1 154 253 | 4/1958 |
| FR | 2 520 806 | 8/1983 |
| FR | 2 606 077 | 5/1988 |
| FR | 2 639 609 | 6/1990 |
| GB | 759606 | 10/1956 |
| GB | 971690 | 9/1964 |
| GB | 973388 | 10/1964 |
| GB | 2 197 392 A | 5/1988 |

* cited by examiner

*Primary Examiner*—Ninh H. Nguyen
(74) *Attorney, Agent, or Firm*—Oblon, Spivak, McClelland, Maier & Neustadt, P.C.

(57) ABSTRACT

A turbojet includes a differential gear with a first planetary pinion driven by the shaft of the high pressure spool and a second planetary pinion driven by the shaft of the low pressure spool. The planetary pinions drive satellite pinions mounted in a cage by which the ancillary machines are driven. The satellite pinions and said cage are co-rotary and the mechanical transmission ratio $R_1$ between the high pressure shaft and the first planetary pinion of the differential gear and the transmission ratio $R_2$ between the low pressure shaft and the second planetary pinion of the differential gear are such that the power extraction distribution between the high pressure spool and the low pressure spool at idle speed is between 80%/20% and 20%/80%. The operation of the high pressure compressor is not affected by the maximum power drawn by the ancillary machines.

15 Claims, 2 Drawing Sheets

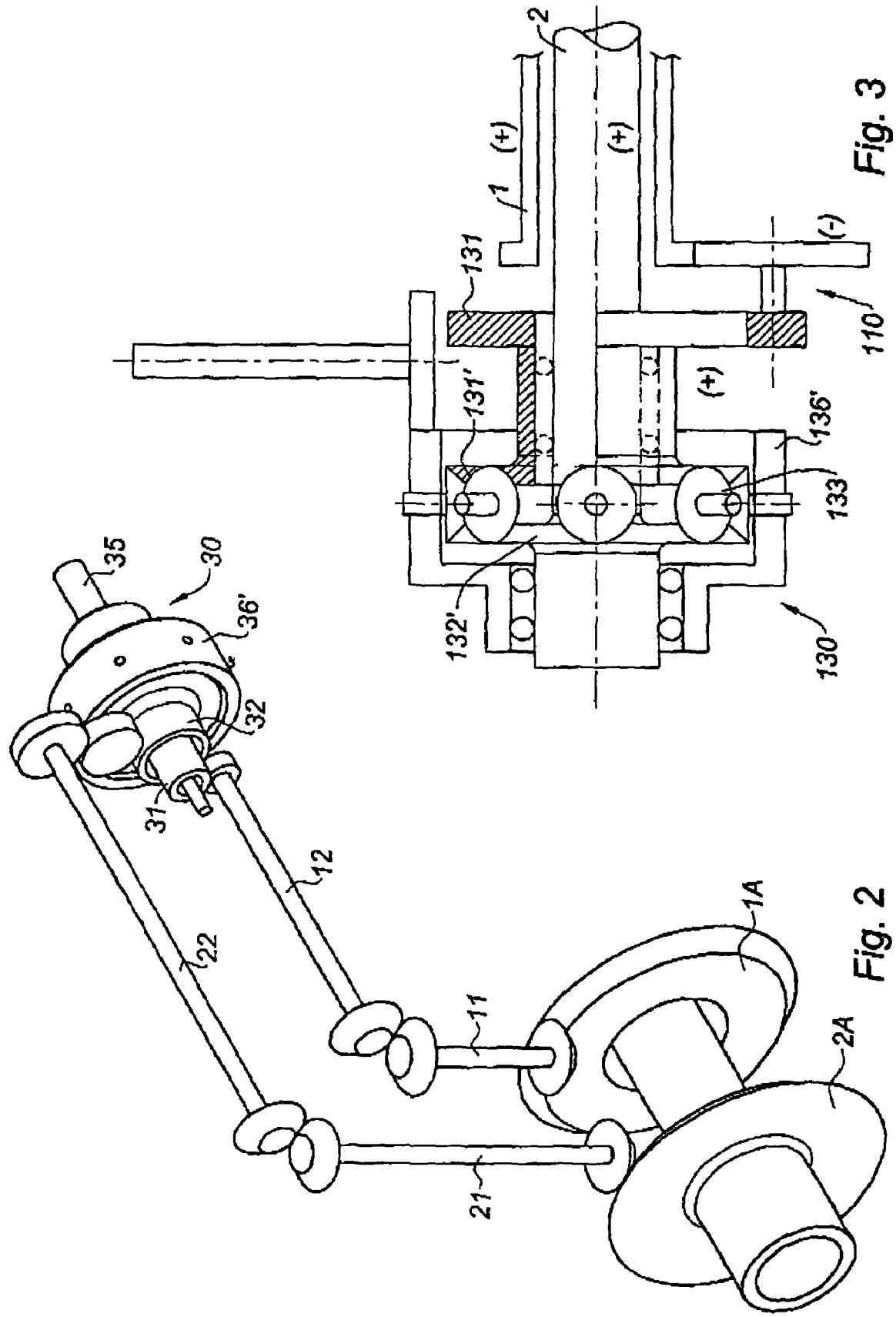

TWIN-SPOOL TURBOJET WITH MEANS FOR DRIVING ANCILLARY MACHINES

Figure 1:
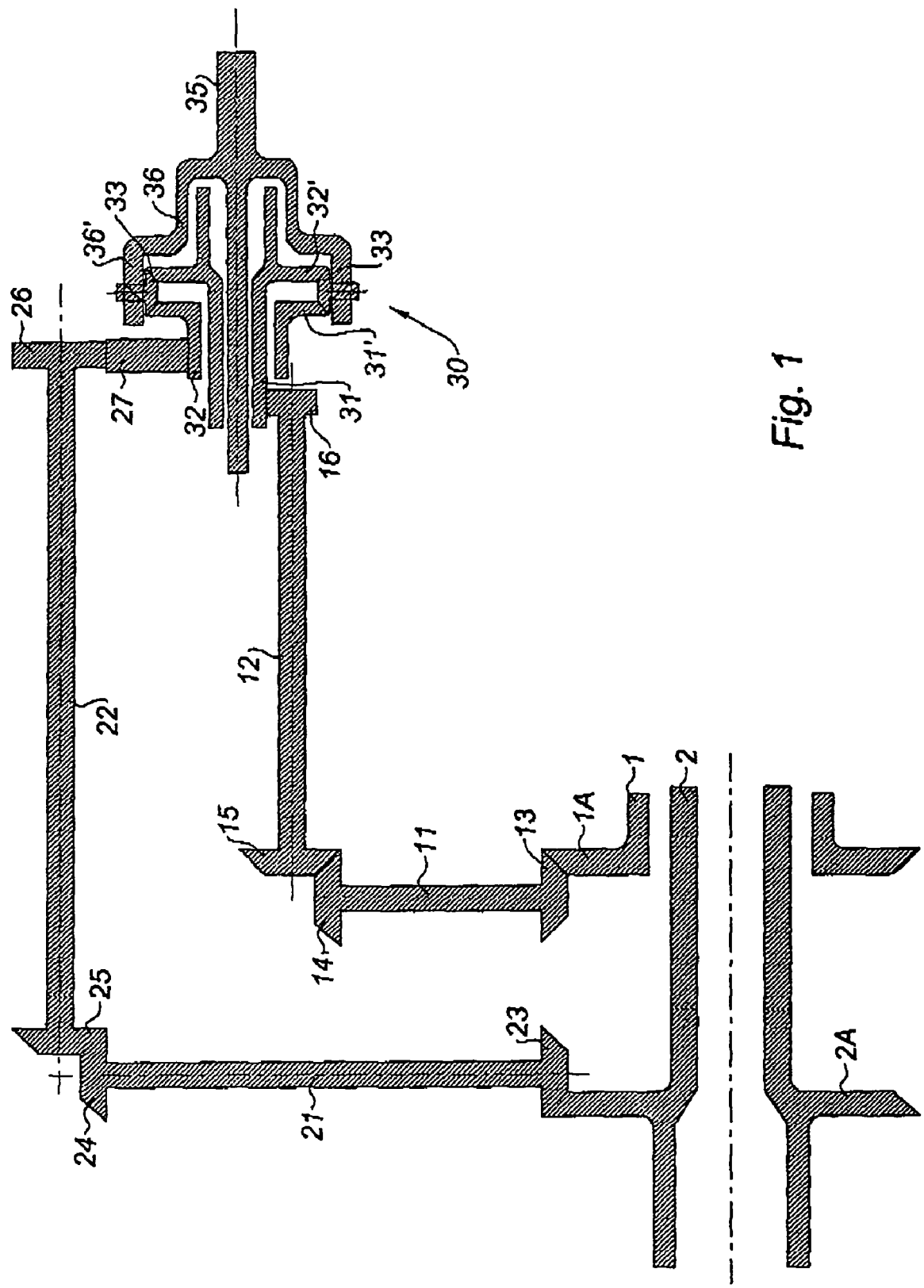

The present invention relates to the field of twin-spool turbo engines for propulsion of aeroplanes and other aircraft and is particularly directed to twin-spool turbo jets, the rotors of which are free to rotate relative to each other and the low pressure rotor of which drives a fan.

A portion of the power provided by aircraft turbo engines is used for powering the ancillary services both of the turbo engines themselves and of the aeroplane for which they provide propulsion.

At the present time, this power is partly extracted on the shaft of the high pressure stage of the twin-spool engine mechanically in order to drive the input shaft of an accessory casing. For a turbo engine with a fan, the accessory casing is positioned on the fan case, for example. Its input shaft is generally driven by a transfer shaft housed in one of the structural arms of the casing and connected through a transfer gear box to a pinion integral with the high pressure shaft. Different ancillary machines, such as generators and oil or fuel hydraulic pumps are contained and driven in this accessory casing.

Another portion of the extraction consists of pressurized air extracted at the high pressure compressor in order to notably provide pressurization and conditioning of the cabin of the aircraft or deicing.

The present trend aims at increasing the extracted mechanical power portion because of the increasing portion of electrical means, supposed to be more flexible in use.

However, a large mechanical power extraction has a negative effect on the operation of the high pressure spool as it is likely to cause pumping of the compressor, in particular when the engine is running at low speed.

A conceivable solution consists of extracting a portion of the mechanical power on the low pressure spool. However, another problem is then encountered because the ratio between the speeds for both spools considerably varies between idle speed operation and full speed operation. For example, between idle speed and full speed, the high pressure spool changes from 10 000 to 16 000 rpm, whereas the low pressure spool changes from 900 to 4 500 rpm. For the first, the ratio is 1.6 whereas for the second it is 5. At idle speed, the available power on the low pressure spool would therefore become too low relatively to that when running at full speed. This is a handicap which is all the more troublesome because the power requirements on an aircraft are also high, all the more so, when idling than at cruising speed.

A solution would consist of interposing an automatic gear box between both shafts but this appears unwieldy and would require special electro-hydraulic control.

With the invention, the problem may be solved satisfactorily.

According to the invention, the turbo engine with twin spools, a high pressure high pressure spool and a low pressure low pressure spool, including ancillary machines which it drives via mechanical transmission means comprising a differential gear with a first planetary pinion driven by the shaft of the high pressure spool and a second planetary pinion driven by the shaft of the low pressure spool, said planetary pinions driving satellite pinions mounted in a cage, by which the ancillary machines are driven, is characterized by the fact that said planetary pinions and said cage are co-rotary and that the mechanical transmission ratio $R_1$ between the high pressure shaft and the first planetary pinion of the differential gear on the one hand and the transmission ratio $R_2$ between the low pressure shaft and the second planetary pinion of the differential gear on the other hand, are such that the power extraction distribution between the high pressure spool and the low pressure spool at an idle speed is between 80%/20% and 20%/80% and in any case, are such that operation of the high pressure compressor is not affected by the maximum power drawn by the ancillary machines.

Hence, the percentage of power allotted to the high pressure spool is reduced so that the high pressure compressor operates properly, in particular at idle speed, i.e., 20% low pressure, 80% high pressure, typically in the example reported later on, instead of 0% low pressure, 100% high pressure, in the present situation of the state of the art.

Hence, with the invention, by using a differential gear in the kinematic chain between both driving shafts and the receiving machines, a suitable power extraction distribution may be selected between high rotational speed operating conditions and idle speed operating conditions.

According to a first embodiment, the cage of the differential gear is connected to an accessory casing wherein at least a portion of said ancillary machines is grouped together.

According to another embodiment, the differential gear is positioned in the extension of both of the rotors of the turbo engine. In particular, the cage of the differential gear separately drives at least a portion of the ancillary machines.

The solution of the invention is particularly advantageous in an all-electric configuration where the whole set of ancillary machines consist of electric generators.

Preferably, the differential gear is of the self-blocking type. In the event of failure of one of the shafts, transmission between the engine and the machines is thereby ensured.

The invention will now be described in more detail, with reference to the drawings wherein:

FIG. 1 schematically illustrates a sectional view of a layout according to a first embodiment of the invention, FIG. 2 is an isometric view of the layout according to FIG. 1, FIG. 3 schematically illustrates a layout according to a second embodiment.

Referring to FIG. 1, an example of a kinematic chain between both shafts 1 and 2 of the twin-spool turbojet on the one hand and the output shaft 35 of the differential gear 30 on the other hand is illustrated through which a receiving machine, such as a generator, is driven. The turbojet was not illustrated.

An end of the shaft 1 of the high pressure spool is provided with a conical pinion 1A. For example, this may be its upstream end on the fan's side. The shaft 2 of the low pressure spool of the engine is concentric with the shaft 1. It also comprises a conical pinion 2A on the same side. As is known in this field, both shafts are mounted into suitable bearings, are driven into rotation by their respective turbine rotors and freely rotate relatively to each other. In turbo engines with fans commonly in operation at the present time, the low pressure shaft is extended upstream where it drives the rotor of the fan.

A transmission shaft 11, provided with conical pinions 13 and 14 at both of its ends, is positioned perpendicularly to the axis of the shafts of the engine. The first pinion 13 is engaged with pinion 1A. A second transmission shaft 12 is engaged by a pinion 15 with the pinion 14 of the first shaft 11. It comprises another pinion 16 at its other end which engages with a tubular component 31 forming a first input of the differential gear 30. The dimensional parameters of this transmission are defined so that the speed reduction ratio $R_1$ between the rotational speed of shaft 1 and the rotational speed of the tubular component 31 forming the first input of the differential gear is equal to a determined value. The assembly shown in FIG. 1 is only an exemplary embodiment. It is understood that one skilled in the art may obtain a mechanical transmission with a determined ratio $R_1$ between the shaft 1 and the input of the differential gear in multiple ways, including by changing for reasons of design, the tilt and the number of transmission shafts of the kinematic chain, with respect to the diagram in FIG. 1.

Similarly as regards the low pressure spool, a shaft 21 perpendicular to the axis of the engine is provided with pinions 23 and 24 at its ends, through which the rotary motion of the shaft 2 is transmitted to a shaft 22 parallel to shaft 12. Shaft 22 comprises pinions 25 and 26 at its ends. A pinion 27 coaxial with pinion 26 engages with a second tubular component 32 of the differential gear 30. This component forms the second input of the differential gear. As for the first shaft, the dimensional parameters are defined so that the speed reduction ratio $R_2$ between the rotational speed of shaft 2 and the rotational speed of the tubular component 32 forming the second input of the differential gear is equal to a determined value different from $R_1$. A mechanical transmission of ratio $R_2$ determined between shaft 2 and the second input of the differential gear may also be obtained in multiple ways, including by changing for design reasons, the tilt and the number of transmission shafts of the kinematic chain with respect to the diagram of FIG. 1.

Because of the notably higher speed of the high pressure spool, the reduction ratio $R_1$ is larger than $R_2$, that of the low pressure spool.

The differential gear 30 consists of a rotary casing 36 which is extended with a shaft 35 with which it is integral and the axis of which is parallel to shafts 12 and 22. The casing comprises a cylindrical ring 36', coaxial with shaft 35. A plurality of conical pinions 33 are mounted on radial axes of rotation, integral with the internal wall of the cylindrical ring 36'. The whole forms the cage of the differential gear. The tubular components 31 and 32 are concentric and each of them comprises at its end, a planetary disc, respectively 31' and 32', perpendicular to their axis. They are spaced apart from each other and include at the periphery a conical gear track which engages with the pinion 33 between which they are positioned. The conical pinion 33 thereby forms the satellites of the differential gear.

On the functional diagram in FIG. 1, shafts 1 and 2 are co-rotary, and the arrangement of the transmission is such that the input tubular components 31 and 32 of the differential gear are also co-rotary, as well as the cage of the satellites.

According to another embodiment not shown, shafts 1 and 2 are counter-rotary, transmission is then adapted so that the inputs of the differential gear are co-rotary. Now, with respect to the embodiment illustrated here, providing a pinion for reversing the direction of rotation on one of the transmissions is sufficient.

In practice, the differential gear is for example positioned on the case of the turbojet's fan. Both transmission shafts may be housed inside two structural arms adjacent to the case.

Inside the differential gear, both planetary gears 31' and 32' drive into rotation the satellites 33 which move at their periphery and set the cage 36 into motion at a speed which is a function of the speed of rotation of both planetary gears. The shaft 35 is for example engaged with the input shaft of an accessory casing, driving the machines thereof which are positioned therein.

The operation of the device and the importance which it assumes will now be described.

As mentioned earlier, both shafts 1 and 2 rotate at different speeds, $N_1$ and $N_2$. Both of these speeds are reduced in ratios $R_1$ and $R_2$ depending on the lay-out of the transmission. Therefore, we respectively have $N_1/R_1$ and $N_2/R_2$ at the input of the differential gear 30. The output speed of the differential gear, that of shaft 35, is also well defined. It is simply determined from the observation that the speed of rotation of the cage is equal to half the speed of the second planetary gear if the first one has zero speed: thus the speed of rotation of the cage is $(N_1/R_1-N_2/R_2)/2+N_2/R_2$, i.e., $(N_1/R_1)/2+(N_2/R_2)/2$.

Knowing the speeds at the input of the differential gear and that of the output shaft, the ratios between the extracted powers on each of both shafts may be inferred therefrom. They are respectively equal to the ratio between the speeds at the corresponding input of the differential gear and the speed at the output.

If F is the tangential driving force of the cage at the satellites, the power on the output shaft is $F*((N_1/R_1)/2+(N_2/R_2)/2)$;
the power on the first planetary gear is $(F/2)*(N_1/R_1)$;
the power on the second planetary gear is $(F/2)*(N_2/R_2)$.

Thus, knowing that the speeds at the input of the differential gear of both planetary gears are determined by the speed reduction ratio of the transmission, it is possible via ratios $R_1$ and $R_2$ to distribute on demand between both shafts, the power provided by the ancillary machines, as well as to select the speed of the differential gear.

The solution of the invention is illustrated by the following example.

Speed reduction ratios are set, $R_1=4$ and $R_2=1$.

|  |  | Full speed | Idle speed |
| --- | --- | --- | --- |
| High pressure spool: | $N_1$ | 16,000 | 10,000 |
|  | $N_1/R_1$ | 4,000 | 2,500 |
| Low pressure spool: | $N_2$ | 4,500 | 1,000 |
|  | $N_2/R_2$ | 4,500 | 1,000 |
| Differential gear output: | $N_d$ | 4,200 | 1,750 |

The speeds of rotation are in revolutions per minute.

From this, the percentages of power respectively drawn from both spools, are inferred:

| High pressure rotor | 47% | 72% |
| --- | --- | --- |
| Low pressure rotor | 53% | 28% |

With both of these ratios as selected, it is observed that distribution is substantially balanced at full speed, whereas power provided by the high pressure rotor is relatively higher at idle speed. This is not a drawback if moreover, it has been checked that the power provided by the high pressure rotor did not exceed a threshold beyond which the compressor would start to pump.

It is also checked that the maximum speed of the differential gear (4 250 rpm in our example) does not exceed a value set by its mechanical strength and the lifetime of the satellites.

If such is not the case, it is sufficient to select another combination of the ratios $R_1$ and $R_2$ in order to achieve the desired goal.

Preferably $R_1$ is comprised between 1,5 and 5 for $R_2=1$ and $R_1$ is comprised between 3 and 10 for $R_2=2$.

Another embodiment of the invention is described hereafter, with reference to FIG. 3.

In this alternative, the differential gear is placed at the end of the shaft 1 of the high pressure spool, on the shaft 2 of the low pressure rotor.

The differential gear box 130 consists of a casing or cage 136 with a cylindrical ring 136' bearing the satellite pinions 133, radially orientated inwards and with which planetary discs 132' and 131' engage. The planetary disc 132' is integral with shaft 2. Consequently, transmission ratio $R_2$ is thus equal to 1. The planetary disc 131' is integral with a tubular component 131 forming an input of the differential gear 130. A reduction gear 110 connects it to shaft 1. This gear consists of two pinions with different radii. It determines the reduction ratio $R_1$ between the speed of the shaft of the high pressure rotor and that of the second input of the differential gear.

With this arrangement, it is possible to drive the different ancillary machines on the casing, individually and directly, for example as this is shown by the radial transmission arm. The latter engages with the edge of the crown of the ring 136'. Different transmission shafts to be driven may be fanned out on the periphery of the crown, the shafts passing through distinct structural arms for example, in order to separately drive ancillary machines radially positioned outside the gas jet.

The invention is not limited to the embodiment illustrated by the drawings; multiple alternatives remaining within the framework of its teaching are within the reach of one skilled in the art.

The invention claimed is:

1. A twin-spool turbojet with a shaft of a high pressure spool and a shaft of a low pressure spool including ancillary machines which the turbojet drives via mechanical transmission means comprising:

a differential gear with a first planetary pinion driven by the shaft of the high pressure spool and a second planetary pinion driven by the shaft of the low pressure spool, said planetary pinions driving satellite pinions mounted into a cage by which the ancillary machines are driven, wherein said planetary pinions and said cage are co-rotary and a mechanical transmission ratio $R_1$ between the shaft of the high pressure spool and the first planetary pinion of the differential gear and a transmission ratio $R_2$ between the low pressure shaft and the second planetary pinion of the differential gear are such that a power extraction distribution between the high pressure spool and the low pressure spool at idle speed is between 80%/20% and 20%/180% such that operation of a high pressure compressor is not affected by the maximum power drawn by the ancillary machines, and the cage rotates around an axis different from the axis of the shaft of the high pressure spool and the shaft of the low pressure spool.

2. The turbojet according to claim 1, wherein the cage forming an output unit of the differential gear is connected to an accessory casing wherein at least a portion of said ancillary machines are grouped together.

3. The turbojet according to claim 1, wherein the cage forming an output unit of the differential gear separately drives at least a portion of the ancillary machines.

4. The turbojet according to claim 1, wherein the differential gear is self-blocking.

5. The turbojet according to claim 1, wherein one of the planetary pinions is integral with one of the shaft of the high pressure spool and the shaft of the low pressure spool.

6. The turbojet according to claim 1, wherein one of the shaft of the high pressure spool and the shaft of the low pressure spool drives a fan.

7. The turbojet according to claim 1, wherein the ancillary machines are electric generators.

8. A twin-spool turbojet with a shaft of a high pressure spool and a shaft of a low pressure spool including ancillary machines which the turbojet drives via mechanical transmission means comprising:

a differential gear with a first planetary pinion driven by the shaft of the high pressure spool and a second planetary pinion driven by the shaft of the low pressure spool, said planetary pinions driving satellite pinions mounted into a cage by which the ancillary machines are driven, wherein said planetary pinions and said cage are co-rotary and a mechanical transmission ratio $R_1$ between the high pressure shaft and the first planetary pinion of the differential gear and a transmission ratio $R_2$ between the low pressure shaft and the second planetary pinion of the differential gear are such that a power extraction distribution between the high pressure spool and the low pressure spool at idle speed is between 80%120% and 20%/80% such that operation of a high pressure compressor is not affected by the maximum power drawn by the ancillary machines, and the satellite pinions rotate around an axis substantially perpendicular to the axis of the shaft of the high pressure spool and the shaft of the low pressure spool.

9. The turbojet according to claim 8, wherein the cage forming an output unit of the differential gear is connected to an accessory casing wherein at least a portion of said ancillary machines are grouped together.

10. The turbojet according to claim 8, wherein the cage forming an output unit of the differential gear separately drives at least a portion of the ancillary machines.

11. The turbojet according to claim 8, wherein the differential gear is self-blocking.

12. The turbojet according to claim 8, wherein the differential gear is positioned in an extension of both shafts.

13. The turbojet according to claim 12, wherein one of the planetary pinions is integral with one of the shaft of the high pressure spool and the shaft of the low pressure spool.

14. The turbojet according to claim 8, wherein one of the shaft of the high pressure spool and the shaft of the low pressure spool drives a fan.

15. The turbojet according to claim 8, wherein the ancillary machines are electric generators.

* * * * *